Dec. 12, 1950     O. L. DUSTMAN     2,533,776

METAL BRACE FOR SAW HORSES

Filed June 16, 1947

O. L. Dustman
INVENTOR

BY C. A. Snow & Co.
ATTORNEYS

Patented Dec. 12, 1950

2,533,776

UNITED STATES PATENT OFFICE 2,533,776

METAL BRACE FOR SAWHORSES

Otto L. Dustman, Tucson, Ariz.

Application June 16, 1947, Serial No. 754,925

1 Claim. (Cl. 304—5)

This invention relates to saw horses and the like, and more particularly, has reference to an improved construction thereof embodying the use of novelly formed and arranged metal braces.

By way of background, it is pointed out that in the art to which the invention has reference, it has been customary, heretofore, to construct saw horses with wooden braces, of various types, there being various methods of constructing wooden saw horses that are best described as haphazard and rough.

Thus, it has been found that where saw horses so constructed are subjected to rough use and exposure to the elements, the nails whereby the braces are connected thereto will tend to become loose, and the legs will split where they are held together, this obviously resulting in the horse becoming wobbly and unsafe. Serious accidents can and have readily occurred by reason of the breakdown of such a saw horse while in use.

Additionally, when the work-receiving top member of the horse becomes broken, the entire horse is usually discarded since it has proved to be not worthwhile trying to salvage the article.

In assembling such a saw horse, it has been necessary to employ considerable time in cutting out the legs and top member, and fitting them together, and much laying out and hand work has been necessary even before the legs and braces are nailed on. Despite this fact, the saw horse so constructed is generally bulky in size, and has only a short period of serviceability, as a result of which they are seldom moved from one job to another, and must usually be discarded as a total loss.

The primary object of this invention is to provide a saw horse constructed with specially formed metal braces wherein all the wooden parts thereof, in the event of becoming broken, are capable of separate replacement in an exceedingly short time, and without the necessity of devoting excessive time and trouble in specially forming said parts.

Another important object is to provide a saw horse in which no nails are employed, and wherein, should the legs become loose, as for example by reason of the shrinkage of the wood, they can be tightened to their braces with speed and ease. Thus, a horse is provided that is safe for any use, especially when used for scaffolding.

A further object of the invention is to permit replacement of parts in a short time by the simple expedient of removing the small number of screws required to fasten the parts to the braces.

Still another object of the invention is to permit assembly of the saw horses in the shortest period of time, since they do not require more than a nominal amount of hand work, this saving in time quickly offsetting the cost of the metal braces employed.

Still another important object is to provide a saw horse which can readily be dismantled and moved from place to place, taking up only a minimum of truck space.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawing—

Figure 1:
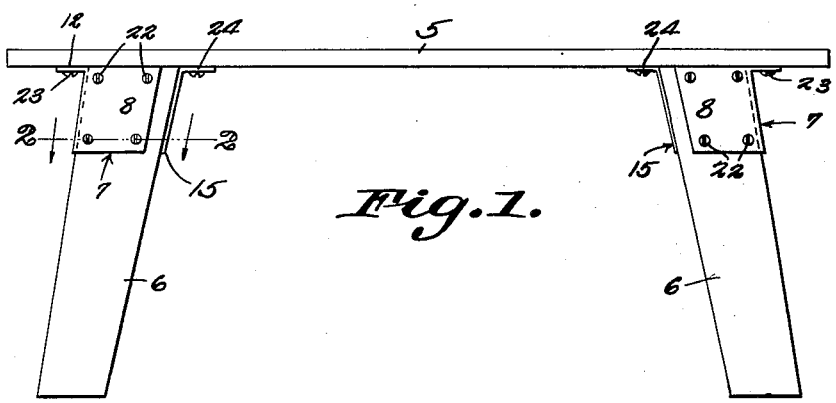
Figure 1 is a side elevational view of a saw horse constructed in accordance with the invention.

Referring to the drawing in detail, 5 designates the work-receiving top member of the saw horse, which is formed from a length of flat wood material, this being of conventional formation, and being readily provided by use of a board of desired length and thickness.

By means of the braces embodied in the invention, which will be described hereinafter in detail, there are secured to the under side of the top member 5, at either end thereof, a pair of legs 6. Considering the top member and legs 6, the saw horse is of the same general outline and appearance as other saw horses commonly in use, my invention consisting in the means employed to connect the legs to the top member. As is well known, the pair of legs 6 at each end comprises legs which diverge outwardly in being extended toward the supporting surface on which the horse rests, for the purpose of providing a firm support. Additionally, for the purpose of providing strength in the horse, each pair diverges outwardly relative to the other pair, as particularly shown in Figure 1. This is a conventional arrangement.

Figure 3:
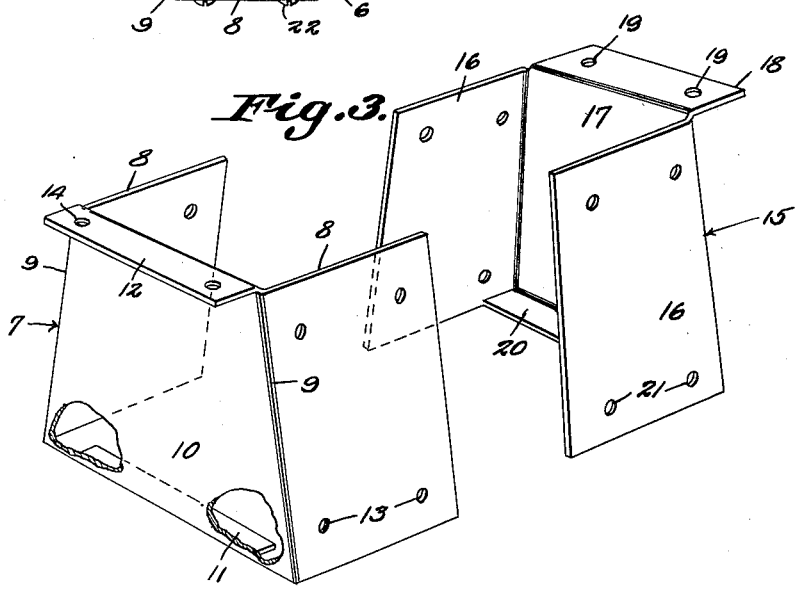
Figure 3 is a perspective view showing an outside and an inside brace used at one end of the saw horse, a portion of the outside brace being cut away for the purpose of showing details of construction.

The invention embodies a pair of identically formed outside braces, one for each end of the saw horse, as shown in Figure 1. As shown, these are oppositely disposed, and each is formed from a piece of sheet metal material that may be bent and cut to provide an outside brace of desired conformation. Each outside brace 7 comprises a pair of wings 8 that are bent inwardly, as at 9, along diverging planes, for connection to the outer surfaces of the diverging legs 6 of each pair of legs. By so forming the wings 8, an intermediate or body portion 10 is provided the lower edge of which is turned inwardly, providing a flange 11. As particularly shown in Figure 3, both ends of this flange are cut away so that the flange is shorter than the bottom edge of the body portion 10, and is centrally disposed relative thereto, the resulting spaces between the ends of the flange 11 and the adjacent wings 8 permitting the accommodation of the outer edges of the legs 6. The flange 11 is provided for the purpose of moving inwardly, out of the position where it can cut the hand of a workman, the lower edge of the body portion 10.

The upper edge of the body portion 10 is bent outwardly to provide a flange 12, that lies against the under surface of the top member 5. In the wings 8, a plurality of bolt holes 13 are formed, and in the upper flange 12 are formed bolt holes 14, preferably two in number, although even one bolt hole 14 will suffice.

Referring now to the inside braces, these are generally designated by the reference character 15. These are also formed from a suitable piece of bendable metal material, and are identically cut, though oppositely arranged when used in assembly of the horse. These are provided with diverging wings 16, that are connectable to the inner surfaces of the legs 6, and which are accordingly spaced closer together than are the wings 8 of the outside braces, this construction being particularly shown in Figure 2. The bending of the wings 16 from the metal material results in the provision of an intermediate or body portion 17, which at its upper edge is bent outwardly to provide an upper flange 18 in which are formed bolt holes 19, and which has its lower edge bent inwardly to provide a lower flange 20. This, like the flange 11 of the outside brace, is preferably used for the purpose of protection against injury.

Figure 2:
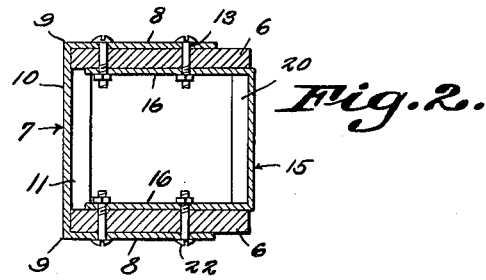
Figure 2 is a view taken on line 2—2 of Figure 1.

A plurality of bolt holes 21 are formed in the wings 16, and when the inside and outside braces are respectively paired and placed in position for connection to the respective pairs of legs 6 and the top member 5, the bolt holes 21 register with the bolt holes 13 of the outside braces, as shown in Figure 2. Bolts and nuts 22 are then used to connect adjacent wings 8 and 16 to a leg 6 interposed therebetween, and to each other. The top member 5 is then mounted by means of screws 23 passed through the holes 14 of the outside braces, and screws 24 passed through the holes 19 of the inside braces.

It is pointed out in this connection that a pair of outside braces and a pair of cooperating inside braces are preformed or manufactured as a set, with which is furnished a paper pattern or the like for cutting out and drilling each leg to the proper shape, and with bolt-receiving holes properly arranged. Thus, it is seen that for the purpose of assembling a saw horse constructed by means of the invention, it is a simple matter to apply the paper pattern to a board for the purpose of cutting it and drilling it to the desired form. The top member 5, as will be obvious, need not be cut from a pattern. The time required in so cutting the legs is far less than the time required in constructing a saw horse in the conventional manner heretofore used.

It is further to be noted that a saw horse constructed and assembled as described above is of unusual strength and durability. Nevertheless, should the saw horse be weakened by reason of shrinkage of the wood used, or should a part be broken, it is a quick and easy task to cut a replacement part, and substitute it for the deformed or broken part.

When it is desired to move the saw horse to another job, it is only necessary to remove the respective bolts and screws, permitting the various parts to be grouped compactly for transportation.

What is claimed is:

Braces for assembling a saw horse of the type including a top member and spaced pairs of legs, comprising an outside and an inside brace for each pair of legs, the braces being co-extensive in length from top to bottom thereof and formed of sheet material to a channeled cross sectional shape open at top and bottom and along one side, each brace including a body portion disposed transversely of said pair of legs and wings integral with and extending from opposite side edges of the body portion to overlie side surfaces of the legs, the body portion of the outside brace being substantially wider than the body portion of the inside brace and the wings of the outside brace being spaced apart a substantially greater distance than the wings of the inside brace, said braces being oppositely disposed and the inside brace being nested within the outside brace, the wings of the inside brace overlying the inner surfaces of the legs and the wings of the outside brace overlying the outer surfaces of the legs, means passing through a leg and through the wings overlying the surfaces thereof for connecting said leg to said wings, and flanges extending from the top edge of each body portion for connection of said body portion to the top member.

OTTO L. DUSTMAN.

REFERENCES CITED

The following references are of record in the file of this patent:

UNITED STATES PATENTS

| Number | Name | Date |
| --- | --- | --- |
| 1,116,240 | Canfield | Nov. 3, 1914 |
| 1,211,069 | Brethour | Jan. 2, 1917 |
| 1,908,858 | Kane | May 16, 1933 |
| 2,197,187 | Larson | Apr. 16, 1940 |
| 2,376,153 | Karow | May 15, 1945 |
| 2,412,764 | Beasley | Dec. 17, 1946 |